(12) United States Patent
Kari et al.

(10) Patent No.: US 9,779,870 B2
(45) Date of Patent: Oct. 3, 2017

(54) METHOD AND APPARATUS FOR TRANSFERRING ELECTROMAGNETIC POWER

(71) Applicant: Nokia Corporation, Espoo (FI)

(72) Inventors: Juhani Kari, Lieto (FI); Petri Vuori, Salo (FI); Jukka Rautiainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 892 days.

(21) Appl. No.: 13/897,562

(22) Filed: May 20, 2013

(65) Prior Publication Data

US 2014/0339904 A1    Nov. 20, 2014

(51) Int. Cl.
*H01F 27/42* (2006.01)
*H01F 38/14* (2006.01)
*H02J 50/10* (2016.01)
*H02J 50/50* (2016.01)

(52) U.S. Cl.
CPC .............. *H01F 38/14* (2013.01); *H02J 50/10* (2016.02); *H02J 50/50* (2016.02)

(58) Field of Classification Search
CPC ................................. H02J 50/10; H02J 50/50
See application file for complete search history.

(56) References Cited

U.S. PATENT DOCUMENTS

| | | | | |
|---|---|---|---|---|
| 5,600,225 A * | 2/1997 | Goto | ...................... | H02J 7/025 320/108 |
| 8,245,843 B1 | 8/2012 | Wu | ............................... | 206/320 |
| 8,310,200 B2 | 11/2012 | Matouka et al. | ............. | 320/108 |
| 9,132,058 B2 * | 9/2015 | Imboden | ................ | A61H 19/00 |
| 2005/0243522 A1 | 11/2005 | Nilsen et al. | ................. | 361/716 |
| 2007/0279002 A1 * | 12/2007 | Partovi | ................ | H02J 7/0027 320/115 |
| 2009/0278493 A1 | 11/2009 | Alden | .......................... | 320/108 |
| 2010/0141369 A1 * | 6/2010 | Mori | ................... | H01F 17/0013 336/200 |
| 2010/0270970 A1 | 10/2010 | Toya et al. | ..................... | 320/108 |
| 2011/0115430 A1 * | 5/2011 | Saunamaki | ............. | H02J 5/005 320/108 |
| 2011/0163713 A1 | 7/2011 | Wang et al. | .................. | 320/108 |
| 2011/0227527 A1 | 9/2011 | Zhu et al. | ..................... | 320/108 |
| 2012/0184338 A1 | 7/2012 | Kesler et al. | ................. | 455/572 |
| 2012/0235636 A1 | 9/2012 | Partovi | ......................... | 320/108 |

(Continued)

FOREIGN PATENT DOCUMENTS

| | | |
|---|---|---|
| CN | 101849343 A | 9/2010 |
| CN | 201966700 | 7/2011 |

(Continued)

OTHER PUBLICATIONS

"WiTricity Wirelessly charge your gadgets"; Article, Mar. 16, 2012. http://www.digitash.com/2012/03/witricity-wirelessly-charge-your.html.

(Continued)

*Primary Examiner* — Daniel Cavallari
(74) *Attorney, Agent, or Firm* — Harrington & Smith

(57) ABSTRACT

A method and apparatus for inductively obtaining alternating current from a first variable magnetic field with an input coil; forming with an output coil a second variable magnetic field using the alternating current; and conducting the alternating current from the input coil to the output coil.

18 Claims, 4 Drawing Sheets

(56) References Cited

U.S. PATENT DOCUMENTS

| | | | | |
|---|---|---|---|---|
| 2012/0286584 | A1 | 11/2012 | Park et al. | 307/104 |
| 2012/0293118 | A1* | 11/2012 | Kim | H02J 5/005 320/108 |
| 2013/0038138 | A1 | 2/2013 | Cook et al. | 307/104 |
| 2014/0339911 | A1* | 11/2014 | Abe | H02J 5/005 307/104 |

FOREIGN PATENT DOCUMENTS

| | | |
|---|---|---|
| EP | 2 472 697 A1 | 7/2012 |
| JP | 2011151900 A | 8/2011 |
| KR | 100800742 B1 | 2/2008 |
| KR | 20100023941 | 4/2010 |
| KR | 20120018031 A | 2/2012 |
| WO | WO-2009/037380 A1 | 3/2009 |
| WO | WO-2011/061388 A1 | 5/2011 |
| WO | WO 2011/099661 A1 | 8/2011 |
| WO | WO-2013/038675 A1 | 3/2013 |

OTHER PUBLICATIONS

Bullis, Kevin; "Charge your phone (and your car) from afar"; MIT Technology review, Feb. 9, 2012; http://m.technologyreview.com/computing/39657/.

Lim, Hyunkeun et al.;"Positioning-free magnetically resonant wireless power transmission board with staggered repeater coil array"; IEEE 2012; p. 93-96.

Davies, Chris; "Nexus 4 Wireless Charging Orb revealed"; StashGear article, Oct. 29, 2012; http://www.slashgear.com/nexus-4-wireless-charging-orb-revealed-29254562/.

Mearian, Lucas; "Power play: Wireless charging at a distance arrives"; PC Advisory article, Oct. 31, 2012; http://www.pcadvisory.co.uk/news/digital-home/3408297/power-play-wireless-charging-at-distance-arrives/.

2013 Best Wireless Charger Comparison and Reviews; TopTen Reviews article, Downloaded on May 20, 2013; http://wireless-charger-review.toptenreviews.com/.

* cited by examiner

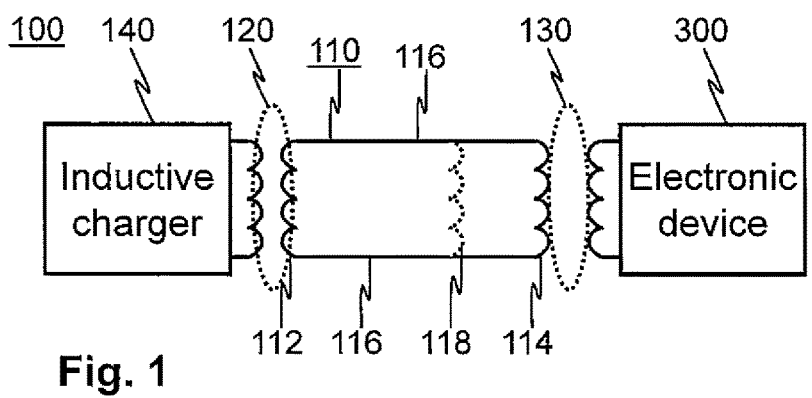
Fig. 1
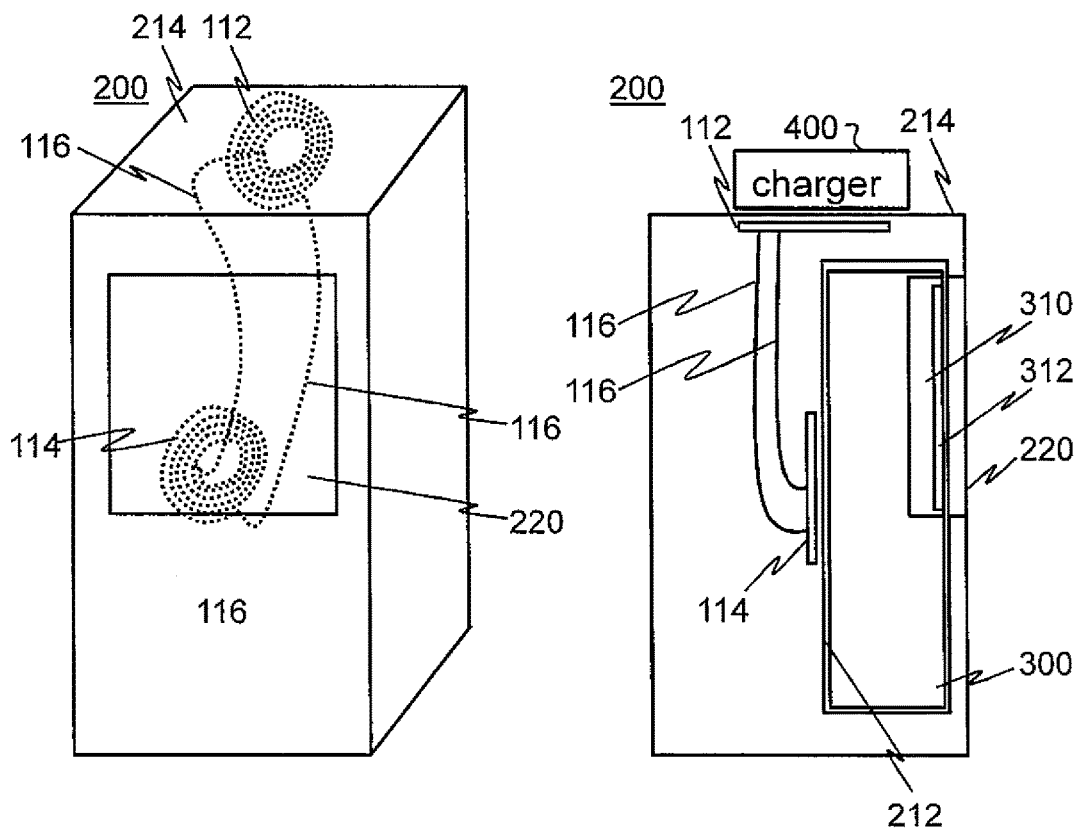
Fig. 2
Fig. 3

METHOD AND APPARATUS FOR TRANSFERRING ELECTROMAGNETIC POWER

TECHNICAL FIELD

The present application generally relates to transferring electromagnetic power. In particular, although not exclusively, the present application relates to transferring electromagnetic power for portable devices.

BACKGROUND

Portable devices such as mobile telephones and tablet computers are usually battery operated and equipped with a charging connector for receiving charging power from a plug of an external charger. Recently, wireless charging has been made available with most sophisticated mobile telephones. With wireless charging, a mobile telephone can be laid onto a charging pillow that contains a coil and necessary circuitry for causing the coil to emit a variable magnetic field. The mobile telephone can obtain direct current from the variable magnetic field using its own coil and rectifier circuitry.

SUMMARY

Various aspects of examples of the invention are set out in the claims.

According to a first example aspect of the present invention, there is provided an apparatus comprising:

an input coil configured to inductively obtain alternating current from a first variable magnetic field at the input coil;

an output coil configured to form at the output coil a second variable magnetic field using the alternating current; and a wiring configured to conduct the alternating current from the input coil to the output coil.

The input coil and the output coil may be identical or similar in operation and/or structure.

The apparatus may comprise a further coil connected to the alternating current by the wiring. The further coil may be configured to operate alternatively as a further variable magnetic field input member and as a further variable magnetic field output member. The further coil may be identical or similar in operation and/or structure.

The input coil may comprise one, two or more than two loops.

The output coil may comprise one, two or more than two loops.

The output coil may be spaced apart from the input coil. The output coil may be spaced apart from the input coil by a distance greater than 3, 5 or 8 cm. The output coil may be spaced apart from the input coil by a distance not greater than 10 cm or 25 cm. The distance may be up to several meters.

The input coil may be a planar coil. The input coil may be a flexible planar coil.

The output coil may be a planar coil. The output coil may be a flexible planar coil.

The wiring may be flexible.
The input coil may be flexible.
The output coil may be flexible.

Any of the wiring; input coil; and the output coil may be covered by a flexible cover. The entire apparatus may comprise a flexible cover. The entire apparatus may be flexible.

The apparatus may be configured to transfer electromagnetic power for portable devices. The apparatus may be configured to power portable devices. The portable devices may be selected from a group consisting of: mobile telephone; tablet computer; navigation device; game device; electronic book; music player; video player; camera; video camera; and camcorder.

According to a second example aspect of the present invention there is provided a support device for an electric device, comprising:

a structure configured to form an output surface and an input surface for engaging with an external magnetic power emission element;

an input coil on or behind the input surface, configured to inductively obtain alternating current from a first variable magnetic field at the input coil;

an output coil on or behind the output surface, configured to form at the output coil a second variable magnetic field using the alternating current; and a wiring configured to conduct the alternating current from the input coil to the output coil.

The support device may be a package. The package may comprise a transparent window. The package may be configured to support the electronic device such that the electronic device is at least partly visible through the window.

The electronic device may comprise a display visible through the window when the electronic device is supported by the output surface or next to the output surface. The display may comprise a touch screen. The electronic device may be a portable device. The electronic device may be selected from a group consisting of: mobile telephone; tablet computer; navigation device; game device; electronic book; music player; video player; camera; video camera; and camcorder.

The window may be configured to enable operation of the touch screen through the window when the electric device is next to the output surface. The window may be configured to enable operation of the camera, (speakers, microphones) through the window when the electric device is next to the output surface.

The input surface may be parallel with the output surface. The input surface and the output surface may be separated by a space. The space may be at least partly occupied by parts or accessories of the electric device. The input surface and the output surface may form two opposite faces of the package. The input coil and the output coil may be aligned such that when a plurality of the support devices are grouped against each other e.g. in a sales rack, the output coil of each sandwiched support device is operationally coupled with an input coil of adjacent input surface of another support device such that power may be passed through a chain of the support devices.

The output surface may be a support surface on which the electronic device can be laid to rest.

The input surface may be perpendicular to the output surface.

The input surface may form at least partly an external surface for the support device.

The support device may be a cradle. The input surface and the output surface may be configured to form two different external faces of the cradle. The cradle may be triangular. The faces may be oblique with relation to each other. The cradle may have a first orientation in which a first face of the cradle operates as the output surface and a second face operates as the input surface, and a second orientation in which the first face operates as the input surface and the second face operates as the output surface.

According to a third example aspect of the present invention, there is provided a cover adapted for an electronic device and comprising the apparatus of the first example aspect configured to transfer variable magnetic field from behind the cover to the electronic device.

The cover may be a smart cover. The cover may comprise extra batteries.

According to a fourth example aspect of the present invention, there is provided a piece of furniture comprising:

a dock for a supply of a first variable magnetic field, the dock comprising an input surface;

a resting portion for holding an electric device that is configured to obtain electric power from a variable magnetic field, the resting portion comprising an output surface;

an input coil on or behind the input surface, configured to inductively obtain alternating current from the supply of the first variable magnetic field at the input coil;

an output coil on or behind the output surface, configured to form at the output coil a second variable magnetic field using the alternating current; and a wiring configured to conduct the alternating current from the input coil to the output coil.

The piece of furniture may be a table.

The input surface and the output surface may locate on different sides of a member of the piece of furniture. Alternatively or additionally, the input surface and the output surface may locate on a common side of a member of the piece of furniture.

The input coil may be concealed.

The output coil may be concealed.

The wiring may be concealed.

One or more of the input surface and the output surface may have appearance corresponding to that of its surroundings.

According to a fifth example aspect of the present invention, there is provided a method comprising:

obtaining inductively alternating current from a first variable magnetic field with an input coil;

forming with an output coil a second variable magnetic field using the alternating current; and conducting the alternating current from the input coil to the output coil.

According to a sixth example embodiment of the present invention, there is provided a system comprising the apparatus of the first aspect and a portable device configured to receive electromagnetic power through the apparatus.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 1 shows a system of a first example aspect of the invention;

FIG. 2 shows a support device for an electric device according to a second example aspect of the present invention as a perspective drawing;

FIG. 3 shows a support device for an electric device according to a second example aspect of the present invention as a section drawing seen directly from one side;

DETAILED DESCRIPTION OF THE DRAWINGS

Figure 4:
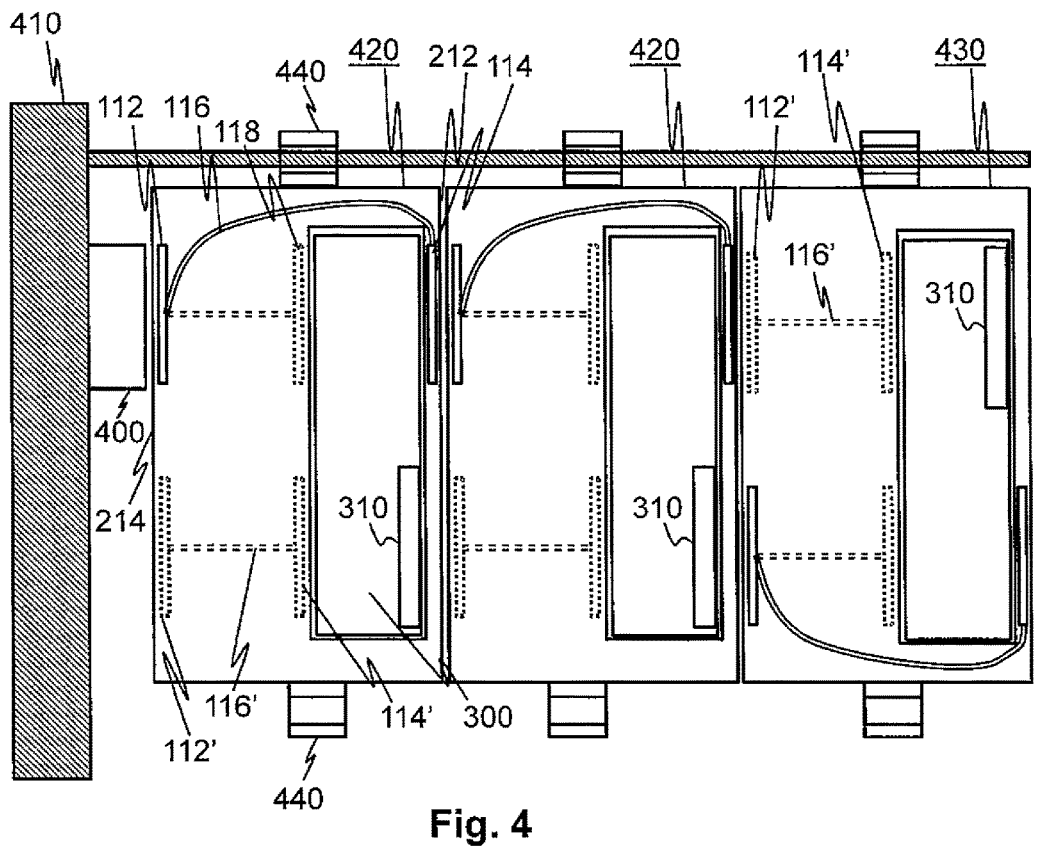
FIG. 4 illustrates an example embodiment in which the input surface and the output surface form two opposite faces of the package.

An example embodiment of the present invention and its potential advantages are understood by referring to FIGS. 1 through 11 of the drawings. In this document, like reference signs denote like parts or steps.

FIG. 1 shows a system 100 of a first example aspect of the invention. The system 100 comprises an apparatus 110. The apparatus 110 comprises:

an input coil 112 configured to inductively obtain alternating current from a first variable magnetic field 120 at the input coil 112;

an output coil 114 configured to form at the output coil 114 a second variable magnetic field 130 using the alternating current; and a wiring 116 configured to conduct the alternating current from the input coil 112 to the output coil 114.

In an example embodiment, either or both of the input coil 112 and the output coil 114 comprise one or more magnetic shielding materials such as ferrite arranged to further guide the magnetic flux. The magnetic shielding materials are chosen in an example embodiment from ferromagnetic metal(s) or metal(s) containing iron, nickel or cobalt.

FIG. 1 further shows an inductive charger 140 configured to produce the first variable magnetic field 120 and an electronic device 300 configured to obtain electric current from the second variable magnetic field 130.

In an example embodiment, the input coil 112 and the output coil 114 are identical or similar in operation and/or structure.

In an example embodiment, the apparatus comprises a further coil 118 connected to the alternating current by the wiring 116. In an example embodiment, the further coil 118 is configured to operate alternatively as a further variable magnetic field input member and as a further variable magnetic field output member. In an example embodiment, the further coil is identical or similar in operation and/or structure with the input coil 112 and/or with the output coil 114. The further coil 118 can be connected in parallel as in FIG. 1 or in series with the output coil 114. In case of two or more further coils, some of the further coils can be connected in parallel and some in series with regard to the output coil 114.

In an example embodiment, the input coil 112 comprises one, two or more than two loops.

In an example embodiment, the output coil 114 comprises one, two or more than two loops.

In an example embodiment, the output coil 114 is spaced apart from the input coil 112. In an example embodiment, the output coil 114 is spaced apart from the input coil 112 by a distance greater than 3, 5 or 8 cm. In an example embodiment, the output coil 114 is spaced apart from the input coil 112 by a distance not greater than 10 cm or 25 cm. In an example embodiment, the input coil 112 and the output coil 114 are spaced apart by the wiring with a distance up to several meters.

In an example embodiment, the input coil 112 is a planar coil. In an example embodiment, the input coil is a flexible planar coil.

In an example embodiment, the output 114 coil is a planar coil. In an example embodiment, the output coil 114 is a flexible planar coil.

In an example embodiment, the wiring is flexible.

In an example embodiment, the input coil 112 is flexible.

In an example embodiment, the output coil 114 is flexible.

In an example embodiment, any of the wiring 116; the input coil 112; and the output coil 114 is covered by a flexible cover. In an example embodiment, the entire apparatus comprises a flexible cover 119. In an example embodiment, the entire apparatus is flexible.

In an example embodiment, the apparatus 110 is thin. In an example embodiment, any or all of the input coil 112, the output coil 114 and the wiring 116 have a thickness of 0.2 to 5 mm or less.

In an example embodiment, any or all of the input coil 112, the output coil 114 and the wiring 116 is made of a flexible electrically isolating material or flexible structure of rigid elements on which or within which electrically conducting lines are provided. In an example embodiment, any or all of the input coil 112, the output coil 114 and the wiring 116 further comprises a magnetic shielding element comprising magnetic shielding material, positioned on back side of at least one coil so as to direct magnetic flux in the at least one coil in question.

FIGS. 2 and 3 show a support device 200 for an electric device 300 according to a second example aspect of the present invention as a perspective drawing (FIG. 2) and as a section drawing (FIG. 3) seen directly from one side. The support device 200 comprises:

a structure 210 configured to form an output surface 212 and an input surface 214 for engaging with an external magnetic power emission element 400;

an input coil 112 on or behind the input surface 214, configured to inductively obtain alternating current from a first variable magnetic field 120 (see FIG. 1) at the input coil 112;

an output coil 114 on or behind the output surface 212, configured to form at the output coil 114 a second variable magnetic field 130 (see FIG. 1) using the alternating current; and a wiring 116 configured to conduct the alternating current from the input coil 112 to the output coil 114.

In an example embodiment, the support device 200 is a package. In an example embodiment, the package comprises a transparent window 220. In an example embodiment, the package is configured to support the electronic device 300 such that the electronic device 300 is at least partly visible through the window 220.

In an example embodiment, the electronic device comprises a display 310 (see FIG. 3) visible through the window 220 when the electronic device 300 is supported by the output surface 212 or next to the output surface 212. In an example embodiment, the display 310 comprises a touch screen 312. In an example embodiment, the window 220 is configured to enable operation of the touch screen 312 through the window 220 when the electric device 300 is next to the output surface 212.

In an example embodiment, the input surface 214 is parallel with the output surface 212. In an example embodiment, the input surface 214 and the output surface 212 are separated by a space (see FIG. 5). In an example embodiment, the space is at least partly occupied by parts or accessories of the electric device 300.

In an example embodiment, the electronic device 300 is a portable device. For example, the apparatus 110 can be configured to power the electronic device 300 i.e. to provide the electronic device (or in an example embodiment two or more electronic devices at the time) with operating power. In an example embodiment, the electronic device 300 is selected from a group consisting of: mobile telephone; tablet computer; navigation device; game device; electronic book; music player; video player; camera; video camera; and camcorder. In an example embodiment, the electronic device 300 is provided with suitable wireless powering circuitry configured to receive power from the apparatus 110. In an example embodiment, the electronic device 300 comprises a battery and is configured to charge the battery through the power received from the apparatus 110. In an example embodiment, a system is formed of the apparatus 110 and of the electronic device 300 to enable the user to use the apparatus 110 to direct the electronic device 300 in a convenient direction for her use when the electronic device 300 is placed on or attached to the apparatus 110.

In an example embodiment, the apparatus 110 and the portable device are configured to form a mechanical attachment configured to hold the portable device in place with relation to the apparatus 110. For example, the apparatus 110 and/or the portable device can be equipped with one or more of a magnet; magnetically adhering element; Velcro® tape; snap fastener; hook; loop; form locking element; and any combination thereof.

FIG. 4 illustrates an example embodiment in which the input surface 214 and the output surface 212 form two opposite faces of the package. In an example embodiment, the input coil and the output coil are aligned such that when a plurality of the support devices 200 are grouped against each other e.g. in a sales rack 410, the output coil 114 of each sandwiched support device 200 is operationally coupled with an input coil 114 of adjacent input surface 214 of another support device 200 such that power can be passed through a chain of the support devices 200.

For hanging in the rack 410, the packages 200 comprise hanging ears 440 on either or both ends. These hanging ears can be e.g. foldable cardboard or plastics loops.

In an example embodiment, each package has an identical or similar apparatus 110 for transfer of power received from a variable magnetic over a series of such apparatuses 110. It is understood that there is some power loss incurred by each transformation of power between magnetic and electric forms and also incurred by transfer through the wiring. In order to enable intended operation of an electronic device 300 that receives power after two or more hops, one example embodiment adapts rectification in the electronic device such that the electronic device can operate with the variable magnetic field available for the electronic device. In another example embodiment, input and output coils 112, 114 in one or more packages are formed such that the number of loops in the input coils 112 and in the output coils 114 are suitably different such that the voltage induced at the input coil 112 of subsequent unit does not excessively drop.

In an example embodiment, the electronic devices 300 has a display side that is directed towards the window in the package. When the package is directed in the rack towards users or customers, the output coil 114 resides on the display side and outputs a variable magnetic field using power received from the rear side of the package. In order to also provide sufficient power for the electronic device within the package, a three-loop apparatus 110 can be used in which the further coil 118 described with reference with FIG. 1 is provided for energizing the electronic device 300 inside the package 200.

In another example embodiment, the package has two different orientations 110 for different uses. When the package is in the rack 410 in a first orientation, a first package 420 relays magnetic power from the rear side of the package to its front side at an aligned position for reception by the next package. In a second orientation, instead, a second package 430 receives the magnetic power from its rear side with a second input coil 112' and transfers an electric current through a second wiring 116' to a second output coil 114'. With the second output coil 114', the second package 430 outputs magnetic power inside the second package 430 to the electronic device 300. In a simpler variant, there is no second output coil but instead by rotating outmost package to the second orientation, the electronic device 300 has its magnetic charging reception element sufficiently close to the output coil of the preceding package and thus receives power therefrom when the system is in use.

Figure 5:
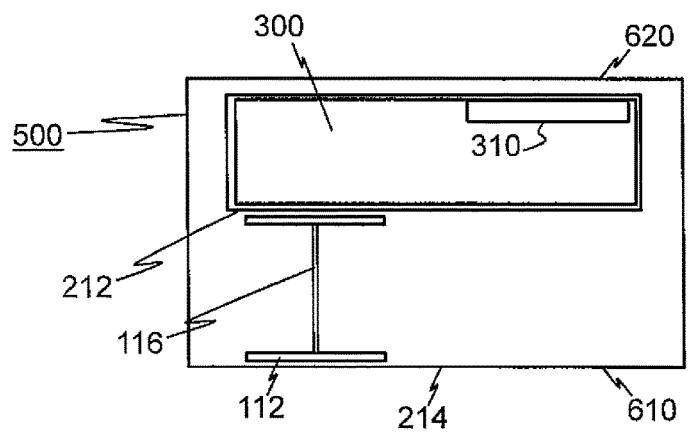
FIG. 5 illustrates a support device of an example embodiment in which the output surface is a support surface on which the electronic device can be laid to rest.

FIG. 5 illustrates a support device 500 of an example embodiment in which the output surface is a support surface on which the electronic device can be laid to rest.

In an example embodiment, the input surface 214 is perpendicular to the output surface 212.

In an example embodiment, the input surface 212 forms at least partly an external surface 610 for the support device 200.

Figure 6:
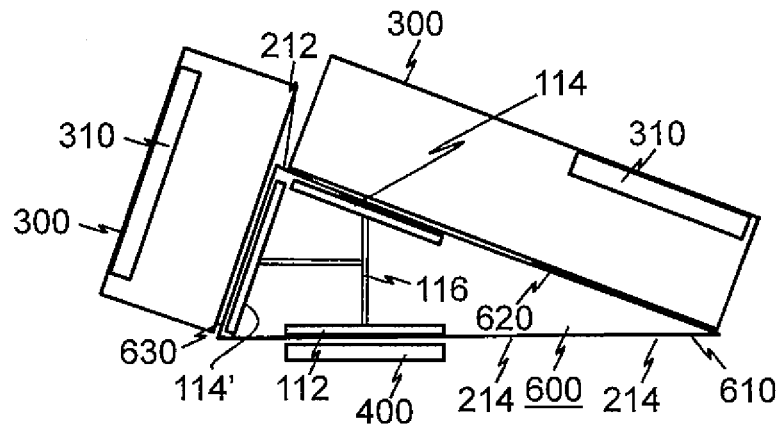
FIG. 6 illustrates a support device of an example embodiment in which the support device is a cradle.

FIG. 6 illustrates a support device 200 of an example embodiment in which the support device 200 is a cradle 600 in a first orientation. In an example embodiment, the input surface 214 and the output surface 212 are configured to form two different external faces 610, 620 of the cradle. The cradle 600 can have a triangular, polynomial or other regular or irregular shape or profile. The cradle 600 has also the second output coil 114' for alternating or simultaneous charging of an electronic device on a third external face 630.

Figure 7:
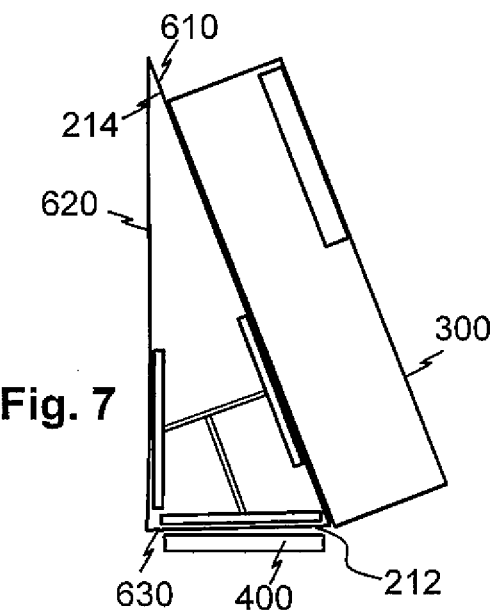
FIG. 7 shows a cradle in which two faces are oblique with relation to each other, in a first orientation in which a first face of the cradle operates as an output surface and a second face operates as an input surface.

FIG. 7 shows the cradle 600 in a second orientation in which the third face 630 of the cradle 700 operates as the input surface 214 and a the first face 610 operates as the output surface 212.

Figure 8:
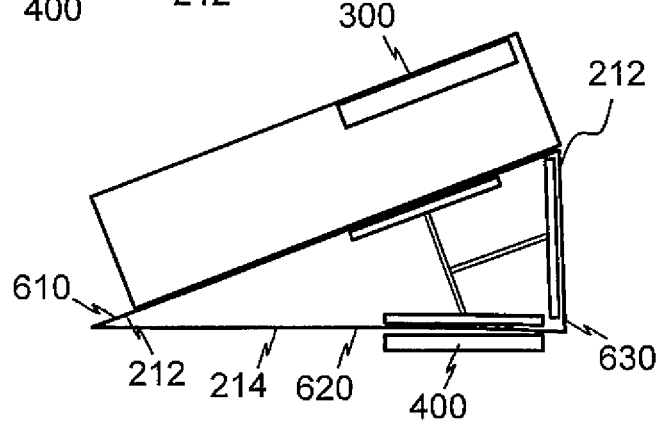
FIG. 8 shows the cradle in a second orientation in which the first face operates as the input surface and the second face operates as the output surface.

FIG. 8 shows the cradle 600 in a third orientation in which the second face 620 operates as the input surface 214 and the first face 610 operates as the output surface 212.

In an example embodiment, the cradle 600 is a rigid unit. The cradle 600 can be made of wood, plastics, ceramics, glass, rubber and/or metals (if the coils are placed such that the variable magnetic field can reach the coils, e.g. if the coils are placed on top of a metal structure).

Figure 9:
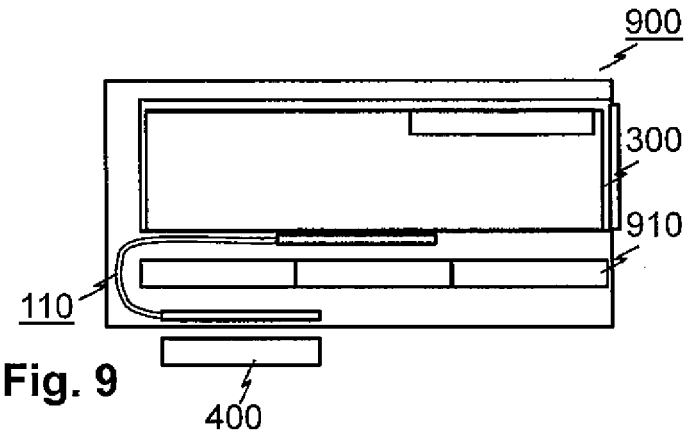
FIG. 9 shows a cover according to a third example aspect of the present invention.

FIG. 9 shows a cover 900 according to a third example aspect of the present invention. The cover 900 is adapted for the electronic device 130 and comprising the apparatus 110 of the first example aspect configured to transfer variable magnetic field from behind the cover 900 to the electronic device 130.

In an example embodiment, the cover 900 is a smart cover. In an example embodiment, the cover comprises extra batteries 910.

Figure 10:
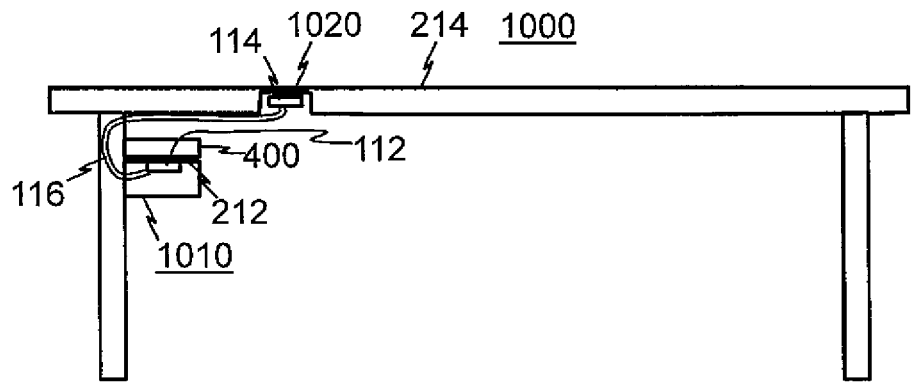
FIG. 10 shows a piece of furniture according to a fourth example aspect of the present invention.

FIG. 10 shows a piece of furniture 1000 according to a fourth example aspect of the present invention. The piece of furniture 1000 comprises:

a dock 1010 for a supply of a first variable magnetic field 120, the dock 1010 comprising an input surface 214;

a resting portion 1020 for holding an electric device 300 (that is configured to obtain electric power from the first variable magnetic field 120), the resting portion 1020 comprising an output surface 212;

an input coil 112 on or behind the input surface 214, configured to inductively obtain alternating current from the supply of the variable magnetic field 120 at the input coil 112;

an output coil 114 on or behind the output surface 212, configured to form at the output coil 114 a second variable magnetic field 130 using the alternating current; and a wiring 116 configured to conduct the alternating current from the input coil 112 to the output coil 114.

In an example embodiment, the piece of furniture 1000 is a table. In an example embodiment, the dock 1010 is simply a portion of a table top, leg or of a part attached to the table.

In an example embodiment, the input surface 214 and the output surface 212 reside on different sides of a member of the piece of furniture 1000. Alternatively or additionally, the input surface 214 and the output surface 212 reside on a common side of a member of the piece of furniture 1000.

In an example embodiment, the input coil is concealed.
In an example embodiment, the output coil is concealed.
In an example embodiment, the wiring is concealed.
The concealing may refer to making not perceivable to a user.

In an example embodiment, one or more of the input surface 214 and the output surface 212 have appearance corresponding to that of its surroundings.

Figure 11:
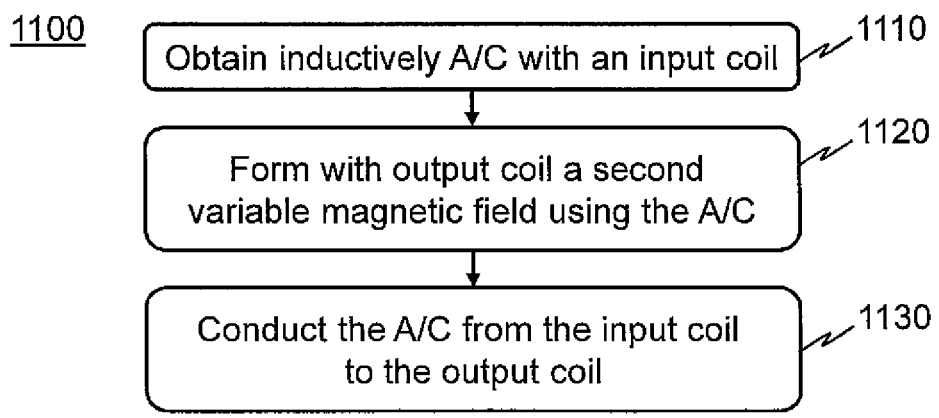
FIG. 11 shows a flow chart illustrating a process according to a fifth example aspect of the present invention.

FIG. 11 shows a flow chart illustrating a process 1100 according to a fifth example aspect of the present invention. The process comprises:

obtaining 1110 inductively alternating current from a first variable magnetic field with an input coil;

forming 1120 with an output coil a second variable magnetic field using the alternating current; and conducting 1130 the alternating current from the input coil to the output coil.

Without in any way limiting the scope, interpretation, or application of the claims appearing below, a technical effect of one or more of the example embodiments disclosed herein is that an existing wireless charger can be used to energize an electronic device in a more convenient viewing angle or in its package. Another technical effect of one or more of the example embodiments disclosed herein is that packaged electronic devices can be powered through a chain of intermediate packages between a source of variable magnetic field and a given package containing a given electronic device. Another technical effect of one or more of the example embodiments disclosed herein is that flexible input and output coils can be flexed to adhere to the shape of the source of variable magnetic field and to the shape of the electronic device to which variable magnetic field is being transferred through the wiring from the input coil, respectively. Yet another technical effect of one or more of the example embodiments disclosed herein is that wireless charging functionality can be provided in various new articles such as pieces of furniture, thanks to possibly very thin form of the apparatus of given example embodiments.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
    a flexible input coil configured to inductively obtain alternating current from a first variable magnetic field at the input coil, wherein the input coil is sufficiently flexible to, when in contact with a magnetic field source producing the first variable magnetic field, adhere to the shape of the variable magnetic field source;
    a flexible output coil configured to form at the flexible output coil a second variable magnetic field using the alternating current, and positioned to transfer the variable magnetic field to an electronic device, wherein, the flexible output coil is sufficiently flexible to, when in contact with the electronic device to which the variable magnetic field is being transferred, adhere to the shape of the electronic device; and
    a flexible wiring configured to conduct the alternating current from the input coil to the output coil.

2. The apparatus of claim 1, wherein the input coil and the output coil are flexible planar coils.

3. The apparatus of claim 1, further comprising a further coil connected to the alternating current by the wiring.

4. The apparatus of claim 3, wherein the further coil is similar in structure to the output coil and the input coil, and is connected between the input coil and the output coil, wherein the positioning and connection of the further coil allows it to operate alternatively as a further variable magnetic field input member and as a further variable magnetic field output member.

5. The apparatus of claim 1, wherein the output coil is spaced apart from the input coil.

6. The apparatus of claim 1, wherein each of the input coil and the output coil is made of a flexible material.

7. The apparatus of claim 1, wherein the apparatus is covered with a flexible cover.

8. The apparatus of claim 1, wherein the wiring is made of a flexible material.

9. A support device for an electric device, comprising:
    a structure configured to form an output surface, and an input surface for engaging with an external magnetic power emission element;
    a flexible planar input coil on or behind the input surface, configured to inductively obtain alternating current from a first variable magnetic field at the input coil, wherein the flexible planar input coil is sufficiently flexible to, when engaged with the external magnetic power emission element, adhere to the shape of the external magnetic power emission element;
    a flexible planar output coil on or behind the output surface, configured to form at the output coil a second variable magnetic field using the alternating current, and positioned to transfer the variable magnetic field to an electronic device, wherein, the flexible output coil is sufficiently flexible to, when in contact with the electronic device to which the variable magnetic field is being transferred, adhere to the shape of the electronic device; and
    a flexible wiring configured to conduct the alternating current from the input coil to the output coil.

10. The support device of claim 9, wherein the support device is a package.

11. The support device of claim 10, wherein the package comprises a transparent window.

12. The support device of claim 11, wherein the package is configured to support the electronic device such that the electronic device is at least partly visible through the window.

13. The support device of claim 9, wherein the electronic device comprises a display visible through the window when the electronic device is supported by the output surface or next to the output surface.

14. The support device of claim 9, wherein the input surface is parallel with the output surface.

15. The apparatus of claim 9, wherein each of the input coil and the output coil is made of a flexible material.

16. The apparatus of claim 9, wherein the wiring is made of a flexible material.

17. A method comprising:
    obtaining inductively alternating current from a first variable magnetic field with
    a flexible input coil, wherein the input coil is sufficiently flexible to, when in contact with a magnetic field source producing the first variable magnetic field, adhere to the shape of the variable magnetic field source;
    forming with a flexible output coil a second variable magnetic field
    using the alternating current, wherein the flexible output coil is positioned to transfer the variable magnetic field to an electronic device, wherein, the flexible output coil is sufficiently flexible to, when in contact with the electronic device to which the variable magnetic field is being transferred, adhere to the shape of the electronic device; and
    conducting the alternating current from the input coil to the output coil.

18. The method of claim 17, wherein the current is conducted along a flexible wiring from the input coil to the output coil.

* * * * *